United States Patent
Iwabuchi

(10) Patent No.: US 8,123,195 B2
(45) Date of Patent: Feb. 28, 2012

(54) PRESSURE CONTROL BUTTERFLY VALVE WITH OPENING/CLOSING MECHANISM

(75) Inventor: Toshiaki Iwabuchi, Gunma (JP)

(73) Assignee: Kitz SCT Corporation, Tokyo (JP)

( * ) Notice: Subject to any disclaimer, the term of this patent is extended or adjusted under 35 U.S.C. 154(b) by 637 days.

(21) Appl. No.: 12/314,196

(22) Filed: Dec. 5, 2008

(65) Prior Publication Data

US 2010/0032598 A1 Feb. 11, 2010

(30) Foreign Application Priority Data

Aug. 6, 2008 (JP) ................................. 2008-202792

(51) Int. Cl.
*F16K 25/00* (2006.01)
(52) U.S. Cl. ......... 251/161; 251/173; 251/174; 277/605
(58) Field of Classification Search .................. 251/172, 251/173, 192, 305–308, 160, 161, 174, 175; 277/583, 605, 646
See application file for complete search history.

(56) References Cited

U.S. PATENT DOCUMENTS

| | | | | | |
|---|---|---|---|---|---|
| 2,673,708 | A | * | 3/1954 | Danks | 251/173 |
| 3,306,316 | A | * | 2/1967 | Stillwagon | 137/375 |
| 3,684,239 | A | * | 8/1972 | Schwartzbart et al. | 251/173 |
| 3,840,208 | A | * | 10/1974 | Schudel et al. | 251/30.02 |
| 4,138,090 | A | * | 2/1979 | Sumner et al. | 251/152 |
| 4,165,859 | A | * | 8/1979 | Maciulaitis et al. | 251/173 |
| 4,540,457 | A | * | 9/1985 | LaValley | 156/182 |
| 4,836,499 | A | * | 6/1989 | Steele et al. | 251/173 |
| 5,700,323 | A | * | 12/1997 | Koch et al. | 118/308 |
| 5,947,445 | A | * | 9/1999 | Wang et al. | 251/306 |
| 6,722,630 | B2 | * | 4/2004 | Oberbeck | 251/173 |
| 6,938,876 | B2 | * | 9/2005 | Kapczynski et al. | 251/161 |

FOREIGN PATENT DOCUMENTS

| | | |
|---|---|---|
| JP | 2516307 | 8/1996 |
| JP | 2006-18767 | 1/2006 |
| JP | 3826114 | 9/2006 |

* cited by examiner

*Primary Examiner* — John Bastianelli
(74) *Attorney, Agent, or Firm* — Wenderoth, Lind & Ponack, L.L.P.

(57) ABSTRACT

A pressure control butterfly valve includes a valve disc rotatable in a vertical direction relative to a flow passage in a body, a seat ring reciprocating in a direction of the flow passage to allow a valve seat seal part to abut on and separate from the valve disc, and a valve opening/closing mechanism provided with an airflow path to which air is supplied in a direction of separating the seat ring from the valve disc and with a spring for biasing the seat ring toward the valve disc. The valve opening/closing mechanism is for nonslidably rotating the valve disc from which the seat ring has been separated by supply of air to the airflow path and for allowing the seat ring to abut on and separate from the valve disc by means of the supply of air to the airflow path and the biasing force of the spring when the valve disc has been rotated to a valve-closed state, thereby controlling pressure in the flow passage.

6 Claims, 9 Drawing Sheets

(a)

(b)

(c)

(a)

(b)

(c)

(a)

(b)

(c)

PRESSURE CONTROL BUTTERFLY VALVE WITH OPENING/CLOSING MECHANISM

BACKGROUND OF THE INVENTION

1. Field of the Invention

The present invention relates to a pressure control butterfly valve used for controlling discharge air of micro flow rate while securing high sealability in a semiconductor fabrication process, for example, and particularly to a pressure control butterfly valve provided with a highly durable isolation function suitable for slowpump control from atmospheric pressure to rough vacuum and for pressure control for stably controlling process gas pressure from a vacuum state at high speed.

2. Description of the Prior Art

Conventionally, a structure has been proposed, in which a pressure control valve with an isolation function is disposed between a vacuum chamber that is a vacuum container and a vacuum pump in a semiconductor fabrication process, for example. The vacuum isolation valve (hereinafter referred to as the "isolation valve") serves to perform both discharge air from the vacuum chamber and stop of the discharge air and to control the internal pressure of the vacuum chamber to approximate prescribed vacuum pressure. In the case of performing pressure control using the isolation valve, it is required to enable performing two controls that are slowpump control and process gas control.

In the case of controlling pressure using the isolation valve, when a valve travel has become abruptly large in vacuum discharge air from atmospheric pressure, the pressure in the vacuum chamber is rapidly changed to generate turbulence, resulting in particles possibly flying in all directions. In order to prevent this, slowpump has heretofore been performed using a small-bore bypass valve disposed in parallel to a main valve. According to the pressure control valve with an isolation function, however, it has become possible to leak a fluid while varying a flow passage in valve travel in dribs and drabs in the vicinity of a place at which a large-bore valve is closed and, in this case, pressure control becomes necessitated in a state of a minute valve travel.

The isolation valve includes a pendulum gate valve, a direct-acting gate valve, an L-shaped valve and a butterfly valve, for example. Since the pendulum gate valve or direct-acting gate valve has a structure making a gap at a valve-closed position large, it is used in many cases for pressure control in a large-bore high-vacuum discharge air system.

As the L-shaped valve, a vacuum proportional control valve of a vacuum pressure control system disclosed in JP-A 2006-18767 can be cited. The vacuum pressure control system of the prior art reference is equipped with the vacuum proportional control valve that is an L-shaped poppet valve, a vacuum pressure sensor and a controller. The vacuum proportional control valve has a valve seat-sealing function, a slowpump function and a pressure control function and, with these functions, serves to solely perform vacuum pressure control.

On the other hand, as a butterfly valve with an isolation function, there is a butterfly valve enabling isolation through opening/closing of a seat ring (refer, for example, Japanese Utility Model Registration No. 2516307). The butterfly valve of the prior art reference has a structure which is provided in a valve disc rotation spacing of the inside of a valve body with a valve disc save space and in which a valve disc is rotated while preventing contact with the inner surface of the valve disc rotation spacing during the rotation of the valve disc. A valve seat thereof advances in the valve disc rotation spacing by the pressure supplied into a pressure space to come into pressure contact with the valve disc, thereby sealing a flow passage. As a result, the butterfly valve prevents contact of the valve disc with the valve body and valve seat during the rotation of the valve disc to prevent wear or damage of the valve disc and enhance the sealability.

Generally, in this case, the butterfly valve has a small face-to-face dimension as compared with a same-bore different-structure valve and a small width for attachment to a pipe as compared with a poppet flow control valve. For this reason, when the butterfly valve is used as an isolation valve, a footprint property is enhanced and, when it is used particularly in the semiconductor fabrication field, it is possible to downsize an overall exhaust system. Furthermore, the butterfly valve can be made lightweight to enable reduction of the material for the same.

Japanese Patent No. 3826114 discloses another butterfly valve having a valve disc opening/closing mechanism. In the valve disc opening/closing mechanism of the butterfly valve, a valve seat seal part is slidable between a seal position at which the seal part comes into intimate contact with the outer circumferential surface of a valve disc and a save position at which the seal part departs from the outer circumferential surface of the valve disc, and a contraption of jetting a cleansing fluid into a gap between the valve seat seal part and the valve body is adopted. Therefore, the butterfly valve intends to remove solid substances to be urged to enter between the valve seat seal part and the valve body, thereby preventing wear or damage of the valve seat seal part or valve body to enhance the sealability.

In the meantime, since a butterfly valve has a structure in which a valve shaft is rotated relative to a valve seat to open or close a flow passage, in the case where a flapper (valve disc) is provided with no sealing material and has no isolation function, it can be operated at high speed to enable flow control. Here, in a butterfly valve provided with a sealing material and having an isolation function, for example, the sealing material will greatly be worn away by rotation and, even when it is coated with a vacuum grease, the sealing area will be worn away by slide, thus lessening durability. This butterfly valve reaches its application limits after several thousand rotations, and a heating-type butterfly valve is further inferior in durability. However, a butterfly valve having no isolation function will suffice if a section to be rotated has high sealability and, since a sealing area is not required to have durability, the butterfly valve can endure even after around a million of rotations.

In the case of controlling vacuum pressure using a butterfly valve having no isolation function, there is a case where a valve system having a combination of this butterfly valve and a different valve is used to control vacuum system. An example of the valve system is shown in FIG. 11. The valve system 1 comprises a pressure control butterfly valve 2 having no isolation function, a vacuum valve 3 for opening/closing a flow passage and a small-bore flow control valve 4. The butterfly valve 2 and vacuum valve 3 are connected in series relative to a vacuum flow passage 5. The flow control valve 4 is connected to the vacuum valve 3 in parallel to the vacuum flow passage 3 to enable bypassing the vacuum valve 3. The flow control valve 4 is used to adjust the flow rate to adjust the discharge air time of slowpump.

The valve system 1 has a configuration in which the vacuum valve 3 is used to open and close the flow passage and the butterfly valve 2 is controlled to be opened or closed at the time of closing the vacuum valve 3, thereby controlling pressure. In addition, in the case of slowpump, the small-bore flow control valve 4 is opened, with the vacuum valve 3 brought to a closed state, to perform slowpump from atmospheric pressure to rough vacuum. With this configuration, the valve system 1 can adjust the discharge air time of slowpump difficult to perform with a butterfly valve alone.

However, the pendulum and direct-acting gate valves have a structure suitable for pressure control of a large-bore high-vacuum discharge air system and have a complicated body structure as compared with the body structure of a butterfly valve. Therefore, the structure of the gate valves is suitable not for fulfilling a slowpump function with an integral model, but for controlling pressure with an intermediate or small model.

Furthermore, since the L-shaped poppet valve is movable so that the valve disc may reciprocate in the direction of a flow passage, the size thereof become large in order to secure a wide movable region of the valve disc and a wide flow passage assumed when the valve disc ascends. For this reason, the poppet valve exhibits a bad footprint property and has a tendency to enlarge the size of a discharge air system as a whole. Furthermore, since the poppet valve adopts a system of controlling the opening/closing motion of a large-bore air cylinder with an electropneumatic positioner, it cannot attain high-speed control.

In the vacuum pressure control system of JP-A 2006-18767, for example, the valve opening-closing stroke of the vacuum proportional control valve becomes large and, moreover, since a bellows is used as a valve seal, high thrust is required for the purpose of operating the control valve. Thus, it is necessary for a pneumatic cylinder to have high thrust in order to operate the vacuum proportional control valve. In addition, since the vacuum pressure control system has the structure of a valve-seat in which the vacuum proportional control valve is sealed with the flat surface, when it has been used for micro control of the slowpump, the pneumatic control is bad in controllability and a problem of hunting etc. due to adhesion of the valve seat will be entailed. For this reason, there is a case where control by mechanical drive of a motor has been adopted and, in this case, however, the system becomes large-sized and the structure thereof becomes complicated.

On the other hand, in the case of using the butterfly valve for vacuum control, in order to cause the butterfly valve to serve as an isolation valve, it is necessary that the valve disc be provided with a sealing material and, in order to enhance the valve seat sealability, that the pressure for fastening the valve disc and the valve seal part be heightened to enhance the adhesion between them. In this case, however, frictional torque exerted when the valve seat has been fastened will become large.

For this reason, in the case of performing pressure control using the butterfly valve having a high valve seat-sealing function, it is necessary that the output of a motor and the reduction ratio of gears be set to be large to increase output torque. However, the increase in output torque delays the operation speed to disable a high-speed control function. In addition, when the size of the motor is made large and the number of the gears is increased, the size of the valve as a whole becomes large. Furthermore, the valve disc and valve seat are easy to wear away to impair the leak performance. Therefore, in the butterfly valve having the isolation function, the limit of the number of rotations of the valve disc will be around hundred thousand times and, moreover, in the case of the heating-type butterfly valve, the limit of the number of rotations will be reduced to lessen the durability thereof. These are problematic.

In view of the above, in the butterfly valve of Japanese Utility Model Registration No. 2516307, it is tried to enhance the sealability through providing the valve disc rotation spacing with the valve disc save space to prevent the valve disc from being worn away. However, since the valve body is formed largely in the diameter expansion direction to form the valve disc save space, the size of the body as a whole becomes large and the width for attachment is increased. Therefore, the butterfly valve of the prior art reference fails to maintain its miniaturization that is one of the merits ordinary butterfly valves have.

Furthermore, in the valve disc opening/closing mechanism of the butterfly valve of Japanese Patent No. 3826114, it is tried to isolate the valve seat seal part from the valve disc. In order to prevent interference between the valve disc and the valve seat seal part during the rotation of the valve disc, however, it is necessary for the valve seat seal part to be isolated greatly from the valve disc and, as a result, the conductance during a small flow rate becomes large. Therefore, it is difficult for the conventional butterfly valve to control the pressure during the small flow rate and unsuitable for vacuum pressure control.

On the other hand, the butterfly valve which has no isolation function and whose valve disc is provided with no sealing material aims mainly at preventing the body and valve seat seal part from being worn away. When the butterfly valve is equipped with a flow control valve with an isolation function, which is disposed in parallel to a poppet valve attached for on-off control to a main pipe of 100 A and when slowpump is performed with a flow control valve having a size of ¼ inch, for example, a gap of around 0.1 mm between a valve disc and a seal part is required in order to control an area of ¼ inch with a butterfly valve having a size of 100 A. However, the butterfly valve having an opening/closing function alone has a gap made larger than necessary from a design standpoint and exhibits inferior min controllability. Therefore, it is impossible to adjust the time of slowpump with the butterfly valve having the opening/closing function alone.

In order to perform slowpump utilizing a large-bore butterfly valve, such as a butterfly valve of 100 A, it is necessary to control opening and closing at separating and contacting positions. In the case of making it impossible to reduce a gap between the valve disc and the valve seat to 0.1 mm or less, the conductance during micro flow rate becomes large as described above. In this case, the range of pressure controllable will be narrow to make it impossible to control the pressure in a sufficient range. However, when the sealability in the vicinity of only the section to be rotated is made high, like this valve, since the part at which wear and leak are mainly induced is in the vicinity of the seal part, there is a merit of enabling high-speed control owing to enhanced durability and small wear resistance.

The valve system 1 shown in FIG. 11 can adjust the discharge air time of the slowpump and control the pressure of the process gas, while it entails the problems of a complicated structure and a large space for attachment to the vacuum pipe 5.

The present invention has been developed as a result of keen studies made in view of the aforementioned problems. The object thereof is to provide a pressure control butterfly valve suitable for controlling the internal pressure of a vacuum region, having excellent durability, solely fulfilling an isolation function, capable of performing both control of the discharge air time of slowpump from atmospheric pressure to rough vacuum and control of the pressure of process gas, only requiring a small space for installation, maintaining a valve-closed state during closing the valve to attain high sealability, and capable of accurately controlling flow rates from a micro flow rate to a large flow rate during the flow control.

SUMMARY OF THE INVENTION

To achieve the above object, the present invention provides, as the first aspect thereof, a pressure control butterfly valve comprising a valve disc rotatable in a vertical direction relative to a flow passage in a body, a seat ring reciprocating in a direction of the flow passage to allow a valve seat seal part to abut on and separate from the valve disc, and a valve opening/closing mechanism provided with an airflow path to which air is supplied in a direction of separating the seat ring from the valve disc and with a spring for biasing the seat ring toward the valve disc. The valve opening/closing mechanism is for nonslidably rotating the valve disc from which the seat ring has been separated by supply of air to the airflow path and for allowing the seat ring to abut on and separate from the valve disc by means of the supply of air to the airflow path and a biasing force of the spring when the valve disc has been rotated to a valve-closed state, thereby controlling pressure in the flow passage.

The second aspect of the present invention is directed to the pressure control butterfly valve of the first aspect, further comprising an electromagnetic valve for supplying the air from a pump to the airflow path and stopping the supply of the air and an electropneumatic regulator which are connected in parallel.

The third aspect of the present invention is directed to the pressure control butterfly valve of the second aspect, further comprising a stepping motor connected to the valve disc for transmission of rotation and a controller connected to the stepping motor and to the electropneumatic regulator. The controller comprises a valve disc control section for controlling rotation of the stepping motor to control a number of rotations of the valve disc and an air control section for controlling output pressure applied to the airflow path by the electropneumatic regulator to control a degree of opening of the seat ring. The air control section controls a valve travel of the electropneumatic regulator so as to control the amount of air (pressure) to be supplied to the airflow path.

The fourth aspect of the present invention is directed to the pressure control butterfly valve of the first aspect, wherein the valve disc has a rotating shaft eccentric from a center of the valve disc and a center of the flow passage.

The fifth aspect of the present invention is directed to the pressure control butterfly valve of the first aspect, wherein the valve disc is provided on a side of contact with the valve seat seal part with an O-ring. The valve seat seal part is formed on an inner circumferential side of the seat ring into a taped or circular arc shape moderately enlarged in diameter from an inside diameter side toward an outside diameter side.

The sixth aspect of the present invention is directed to the pressure control butterfly valve of the first aspect, wherein the body has a stopper attached thereto for regulating to a prescribed position the seat ring that has moved by supply of air to the airflow path.

The seventh aspect of the present invention is directed to the pressure control butterfly valve of the sixth aspect, wherein the stopper comprises a columnar pin and a cam that is eccentric from the pin and has a cam face on which the seat ring abuts.

According to the first aspect of the invention, it is possible to provide a pressure control butterfly valve suitable for controlling the internal pressure of the vacuum region, capable of making the width for attachment to a pipe small to enable a space for installation to be small, making high-speed control with a small operation force, maintaining a valve-closed state during valve-closing to attain high sealability and, during valve-opening, capable of accurately controlling flow rates from a micro flow rate to a large flow rate. In particular, the pressure control butterfly valve exhibits excellent leak performance during the micro flow rate to enable highly accurate pressure control. As a result, it is possible to accurately control the internal pressure of the vacuum region.

According to the second aspect of the invention, the pressure control butterfly valve can bring the valve disc to a valve-opened or valve-closed state with the electromagnetic valve, adopts the electropneumatic regulator to control the distance between the valve disc and the seat ring to make high-speed and highly accurate control of opening and closing of the valve disc, thereby enabling pressure control and thus exhibits excellent leak performance while preventing the entirety thereof from being large-sized and being complicated in structure.

According to the third aspect of the invention, the pressure control butterfly valve performs separately the operation of opening and closing the valve disc and the control of a micro flow rate due to the result of moving the seat ring while maintaining the compactness of the valve body to enable high-speed and highly accurate pressure control.

According to the fourth aspect of the invention, the pressure control butterfly valve causes the valve disc to be rotated while preventing slide of the valve body and seat ring to maintain the sealability during valve-closing and the pressure-control function.

According to the fifth aspect of the invention, the pressure control butterfly valve converts the distance of the seat ring having moved in the direction of the flow passage into an extremely slight valve travel to enable control of a micro valve travel.

According to the sixth aspect of the invention, the pressure control butterfly valve adjusts the position of the seat ring in a fully valve-opened state to enable setting the gap between the seat ring and the valve disc to be the minimum and enable highly accurate pressure control even at an extremely micro flow rate.

Furthermore, according to the seventh aspect of the invention, the pressure control butterfly valve easily adjust the position of the seat ring from the outside of the body through the rotation of the stopper to enable the gap between the seat ring and the valve disc to be set arbitrarily.

The above and other objects, characteristic features and advantages of the present invention will be come apparent to those skilled in the art from the description to be given herein below with reference to the accompanying drawings.

DETAILED DESCRIPTION OF THE PREFERRED EMBODIMENT

Figure 10:
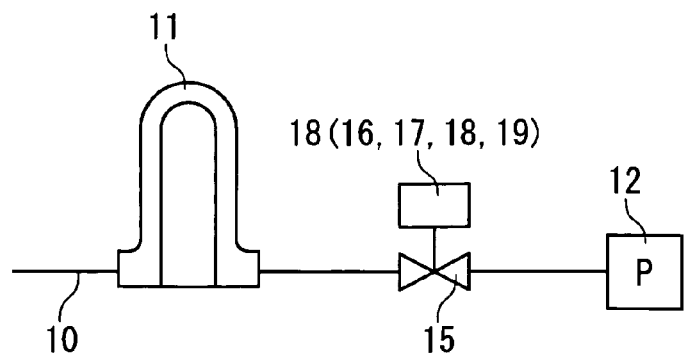
FIG. 10 is a roughly schematic view showing a vacuum flow passage.
Figure 11:
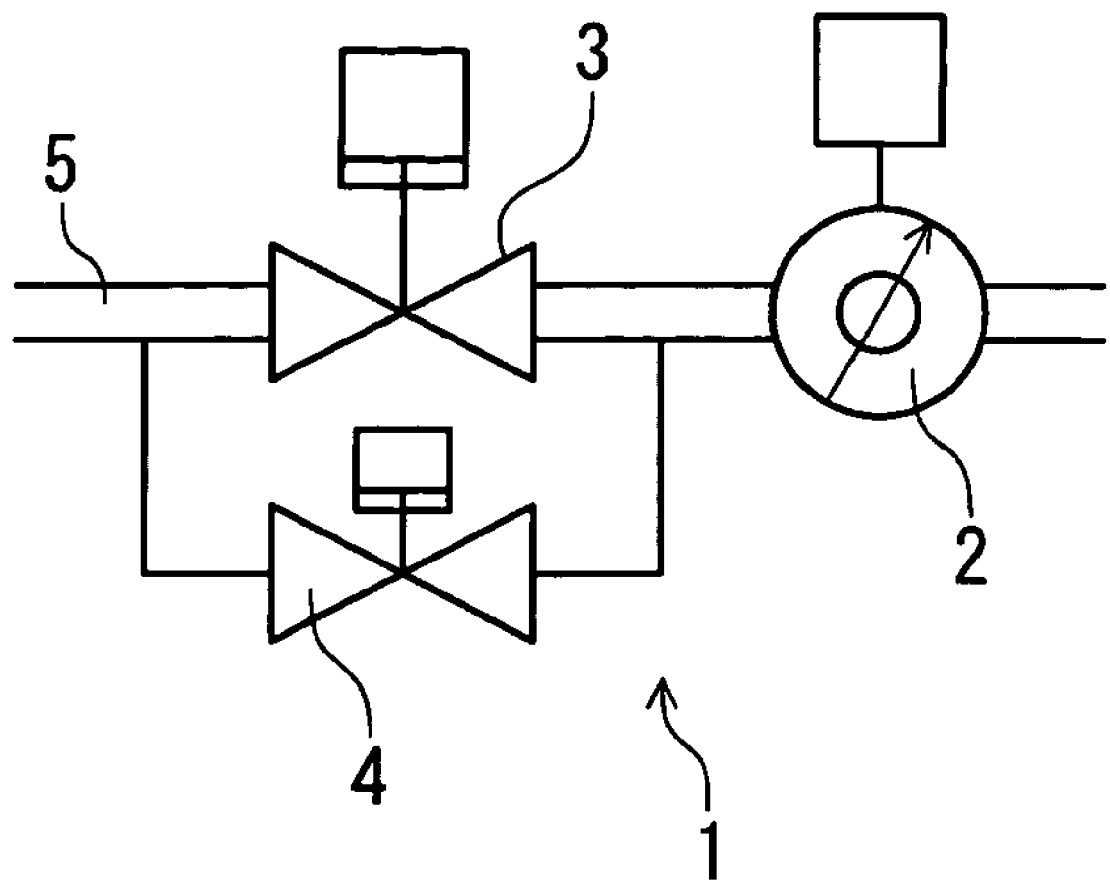
FIG. 11 is a schematic view illustrating a conventional valve system.

A preferred embodiment of the pressure control butterfly valve according to the present invention will be described in detail hereinafter based on the drawings. As shown in FIG. 10, the pressure control butterfly valve of the present invention is connected, between a vacuum chamber 11 and a vacuum pump 12, to a pipeline 10 in a semiconductor fabrication process, for example, and comprises a valve body 15 and a electromagnetic valve 16, an electropneumatic regulator 17, an actuator 18 and a controller 19 that are connected to the valve body 15.

Figure 1:
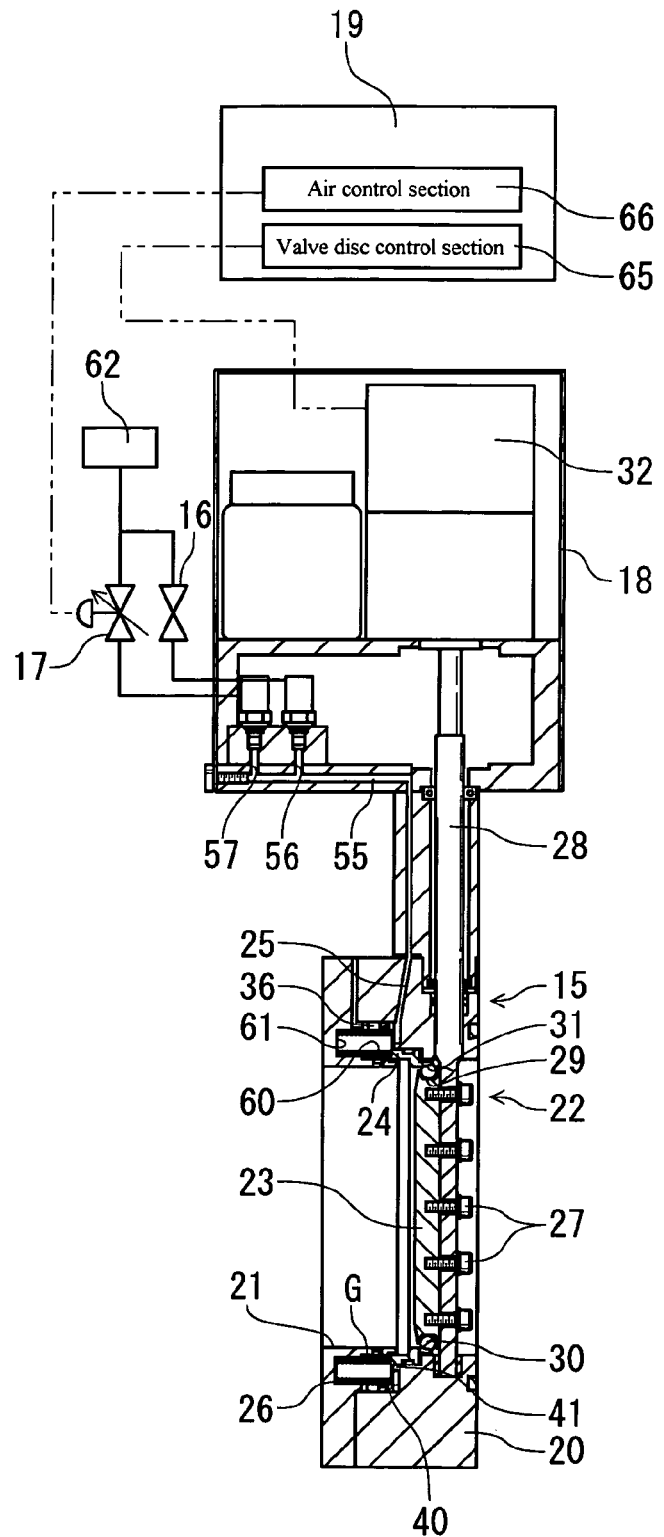
FIG. 1 is a schematic view illustrating a pressure control butterfly valve according to one embodiment of the present invention.

FIG. 1 illustrates one embodiment of the pressure control butterfly valve according to the present invention. The valve body 15 has a body 20 provided therein with a flow passage 21 and is equipped with a valve opening/closing mechanism 22 for opening and closing the flow passage 21. The valve opening/closing mechanism 22 comprises a valve disc 23, a seat ring 24, an airflow path 25 and a spring 26.

In the valve opening/closing mechanism 22, the valve disc 23 is formed in the shape of a substantially circular disc, attached to a valve shaft 28 that is a rotating shaft with fastening bolts 27 and is rotatable in the vertical direction relative to the flow passage 21 by means of the valve shaft 28. Furthermore, the valve body 23 is provided on the outer circumferential side thereof with an attachment groove 29 to which an O-ring 30 is attached. The O-ring 30 is disposed on the side on which a valve seat seal part 31 of the seat ring 24 abuts and seals between the valve seat seal part 31 and the valve disc 23.

Figure 5:
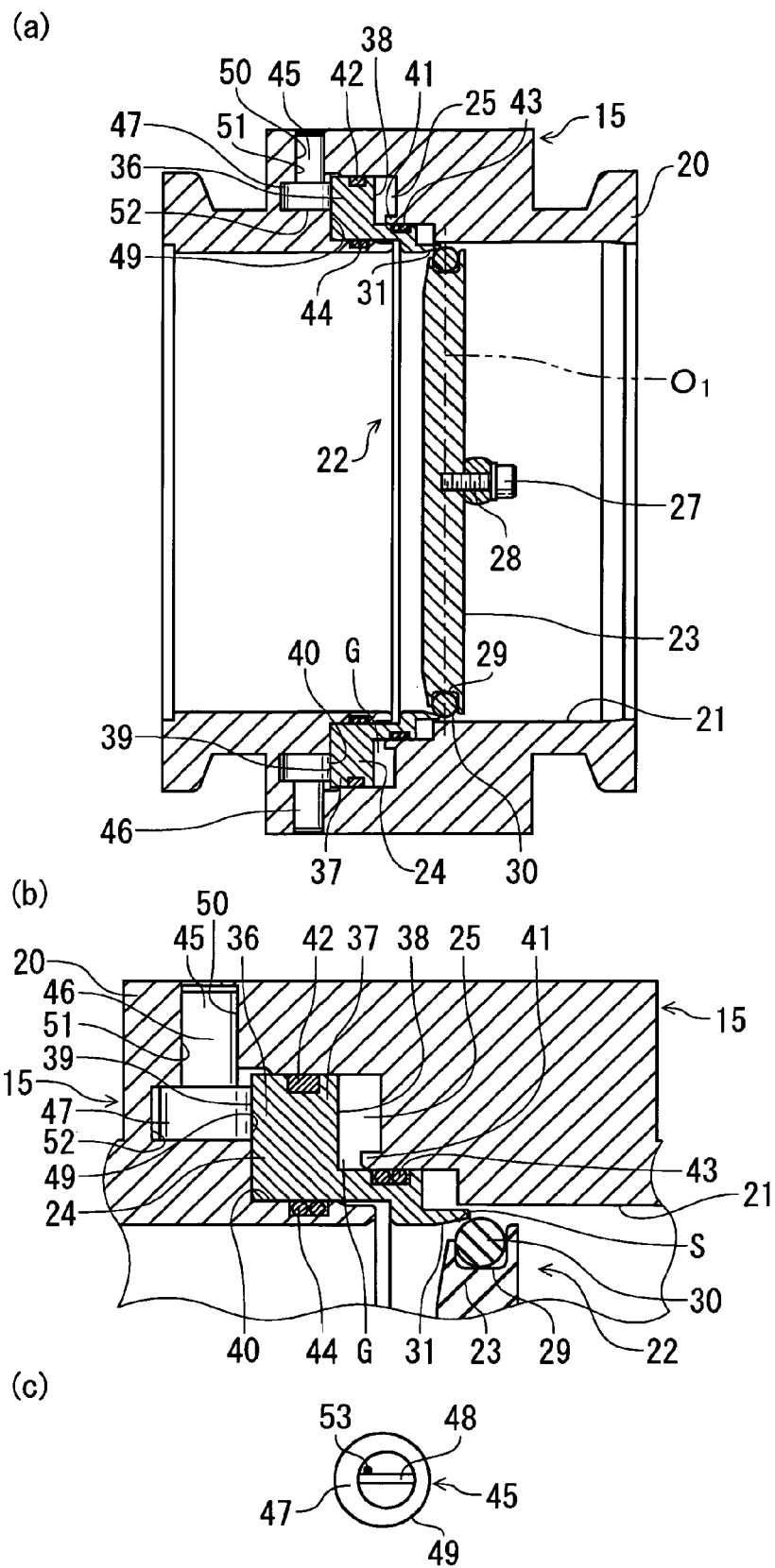
FIG. 5(a) is a partially enlarged cross section corresponding to FIG. 4(a), but in a state having a valve disc rotated, FIG. 5(b) corresponds to FIG. 4(b), but in the state of FIG. 5(a), and FIG. 5(c) to FIG. 4(c), but in the state of FIG. 5(a).
Figure 6:
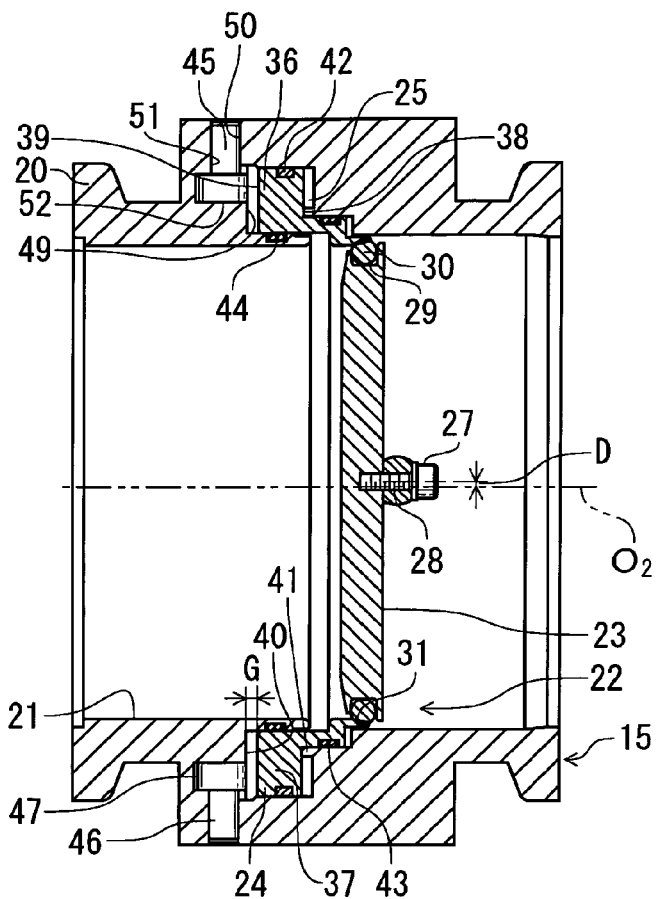
FIG. 6(a) is a partially enlarged cross section corresponding to FIG. 5(a), but in a state having moved a seat ring, FIG. 6(b) corresponds to FIG. 5(b), but in the state of FIG. 6(a), and FIG. 6(c) to FIG. 5(c), but in the state of FIG. 6(a).
Figure 6:
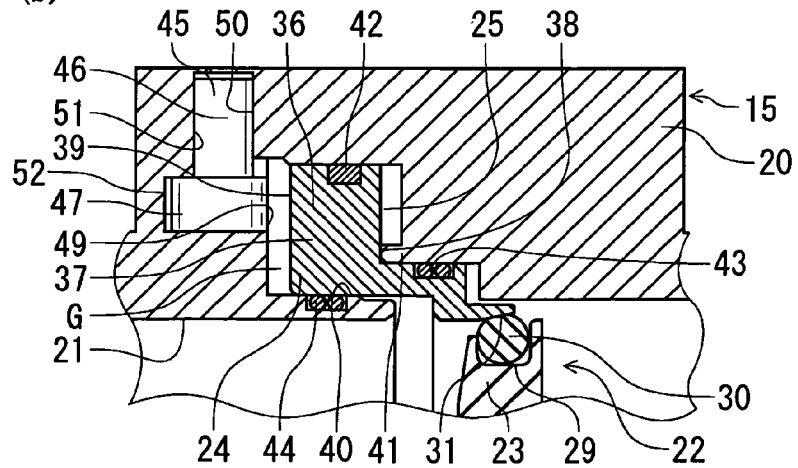
Figure 6:
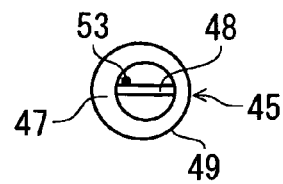

As shown in FIGS. 5 and 6, the valve shaft 28 is eccentric from the center $O_1$ of the valve disc 23 and from the center $O_2$ of the flow passage 21 and, in consequence thereof, the valve body 15 assumes a double eccentric structure. In this case, the amount of eccentricity D of the valve shaft 28 relative to the center $O_2$ of the flow passage is around 1 to 2 mm. Furthermore, the valve shaft 28 has the upper side thereof to which a stepping motor 32 is connected. The stepping motor 32 provides high-precision rotation at a desired angle of rotation while suppressing a swirl error of the valve shaft 28.

The seat ring 24, as shown in FIG. 4(a), is formed into a substantially ring shape and provided with the valve seat seal part 31 and a slide part 36. The valve seat seal part 31 is a part on which the O-ring 30 abuts to attain sealing and is formed on the inner circumferential side of the seat ring 24 into a taped shape moderately enlarged in diameter from the inside diameter side toward the outside diameter side. In FIG. 4(b), a taper angle θ of the valve seat seal part 31, though varying depending on the size of a valve, is set to be an angle at which the valve disc does not interfere during its rotating movement. In the present embodiment, the taper angle θ is set to be 10 to 15°. The valve seat seal part 31 may have a shape other than the tapered shape, such as a circular arc shape. On the other hand, the slide part 36 is formed to allow the seat ring 24 to slide within the body 20 and provided with a regulation part 37 projecting toward the outside diameter side. The regulation part 37 has on the moving sides a valve-closing regulation surface 38 and a valve-opening regulation surface 39, respectively.

The seat ring 24 is installed so that the slide part 36 may be attached to an attachment concave 40 formed in the body 20 and, owing to a gap G provided between the slide part 36 and the attachment concave 40, moves reciprocatively in the vertical direction relative to the flow passage 21, thereby enabling the valve seat seal part 31 to abut on and separate from the O-ring 30. At this time, respective abutments of the valve-opening and valve-closing regulation surfaces 38 and 39 on the annular projection 41 of the attachment concave 40 and on a stopper 45, the respective amounts of reciprocating movement of the seat ring 24 are regulated. In addition, the seat ring 24 and attachment concave 40 are provided with seal rings 42, 43 and 44. With these seal rings 42, 43 and 44, fluid leak from the body 20 and seat ring 24 is prevented from occurring.

As shown in FIGS. 4(b) and 4(c), the stopper 45 comprises a columnar pin 46 and a cam 47 eccentric from the pin 46. In addition, the pin 46 is provided on the distal end side thereof with a groove part 48. On the other hand, the body 20 is provided therein with an accommodation part 50 that has an attachment part 51 in which the pin 46 is accommodated and a diameter-enlarged part 52 in which the eccentric cam 47 is accommodated. The stopper 45, when having been attached to the accommodation part 50, can rotate relative to the accommodation part 50. At this time, the eccentric cam 47 has a cam face 49 disposed at a position abutting on the seat ring 24 to constitute an abutment surface on the seat ring 24.

Figure 7:
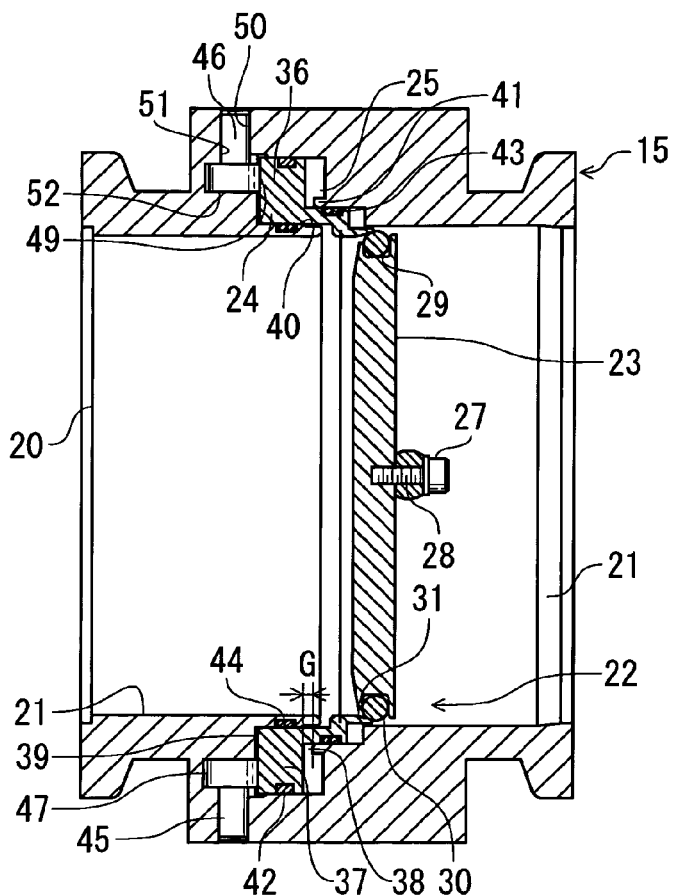
FIG. 7(a) is a partially enlarged cross section corresponding to FIG. 5(a), but in a state having the eccentric cam rotated, FIG. 7(b) corresponds to FIG. 5(b), but in the state of FIG. 7(a), and FIG. 7(c) to FIG. 5(c), but in the state of FIG. 7(a).
Figure 7:
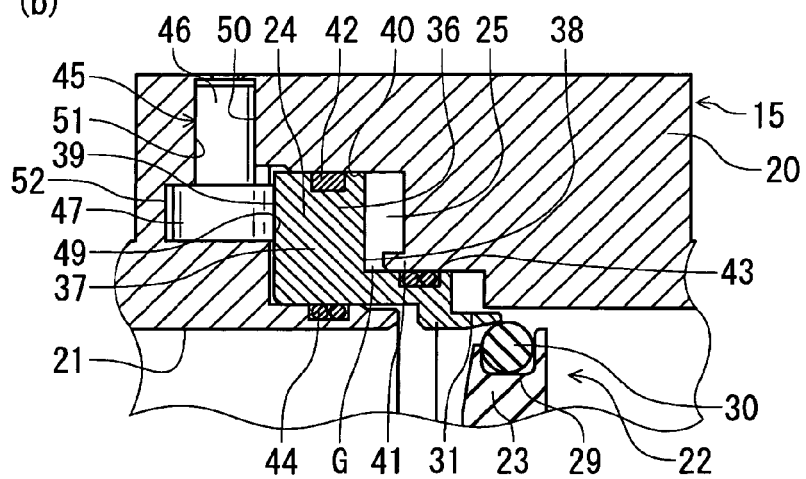
Figure 7:
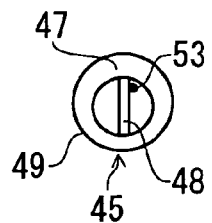
Figure 8:
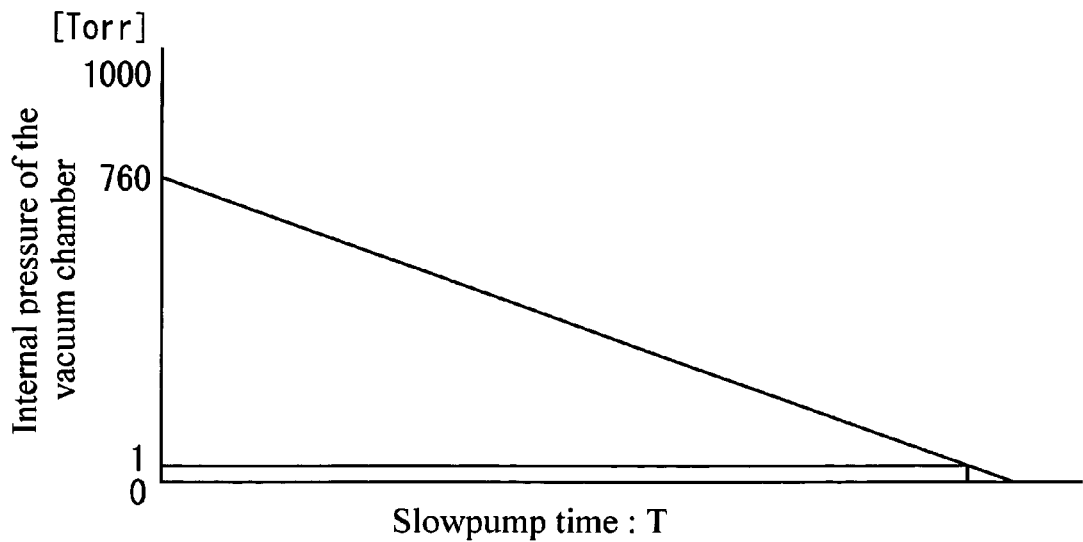
FIG. 8 is a graph showing the relationship between the discharge air time of slowpump and the internal pressure of a vacuum chamber.

With this attachment structure, the stopper 45 can be rotated to be in a state as shown in FIG. 7. As a result, the position of the cam face 49 can be adjusted so as to regulate the amount of the movement of the seat ring 24. When rotating the stopper 45, the distal end of a tool, such as a screwdriver, (not shown) is inserted into the groove part 48 and rotated, with the position of a visually discernible part 53 inscribed on the pin 46 confirmed to enable rotation of the stopper 45 to be in an optional state. In this case, the stopper 45 can be rotated in the range of 0 to 180° to enable adjustment of the state of the cam face 49. The stopper 45 in the present embodiment is provided at two places that are the upper and lower places of the valve body 15.

Figure 2:
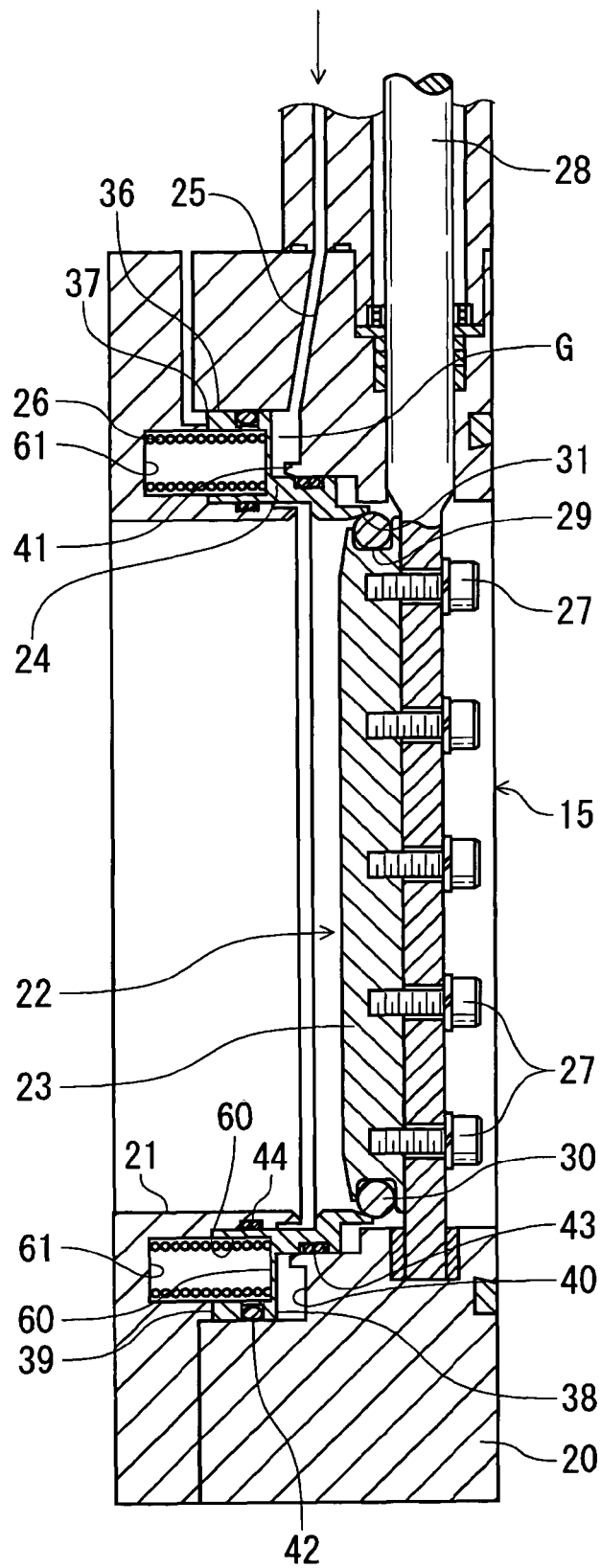
FIG. 2 is an enlarged cross section illustrating a principal part in a state in which air has been supplied to the pressure control butterfly valve of the present invention.
Figure 3:
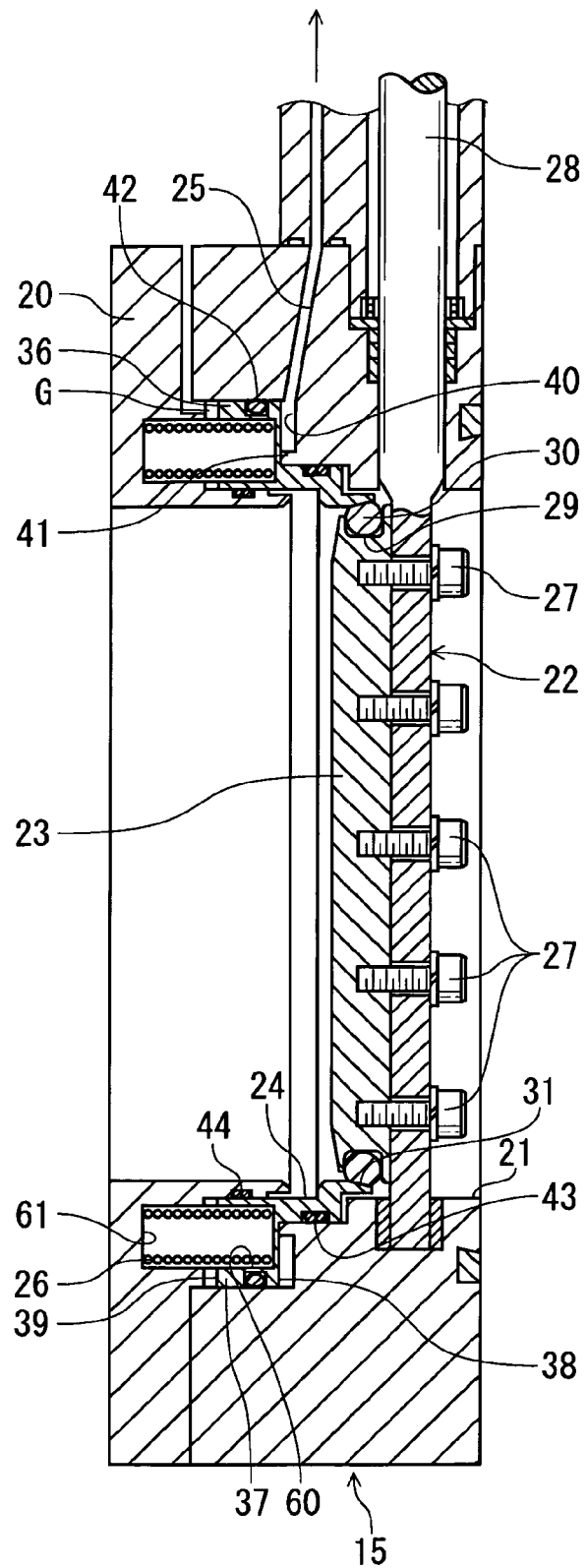
FIG. 3 is an enlarged cross section illustrating the principal part in a state in which the air has been discharged from the pressure control butterfly valve shown in FIG. 2.

As shown in FIGS. 2 and 3, the airflow path 25 is formed from the attachment concave 40 in the body 20 continuously to the outside and, via the airflow path 25, air is supplied to the attachment concave 40. The airflow path 25 is formed at a position at which the seat ring 24 separates from the valve disc 23 when air has been supplied and is connected an airflow path 55 formed inside the actuator 18 mounted on the valve body 23. The airflow path 55 of the actuator is branched from midway, as shown in FIG. 1, to form a first branch flow path 56 and a second branch flow path 57.

The spring 26 is attached, in a snap state in the direction of biasing the seat ring 24 to the valve disc 23, between an attachment part 60 of the seat ring 24 and a concave groove 61 of the body 20. As a consequence, the seat ring 24 is moved toward the valve disc 23 at the normal times by means of the snap of the spring 26 to enable sealing the valve disc 23 that has been rotated to a valve-closed state. When air has been supplied from the airflow path 25, the seat ring 24 is moved against the biasing force of the spring 26 to open the flow passage 21. Thus, the valve body 15 assumes a so-called NC (Normally Closed) mode. In the present embodiment, while eight springs 26 are attached equidistantly in the circumferential direction, the number of the springs may be increased or decreased when necessary.

Furthermore, a locking member (not shown) may be attached at a position not interfering a spring 26 on the surface side of the seat ring 24 to which a spring 26 has been attached. The locking member is inserted between a lock hole (not shown) in the body 20 and a lock hole (not shown) in the seat ring 24 and, in the presence of the locking member, the seat ring 24 is prevented from being rotated relative to the body 20. For this reason, the travel of the seat ring 24 reciprocating relative to the attachment concave 40 is made stable to enable the valve seat seal part 31 to abut on the valve disc 23 in substantially the vertical direction.

As described above, the valve opening/closing mechanism 22 rotates the valve disc nonslidably when air has been supplied to the airflow path 25, with the seat ring 24 separated from the O-ring 30 of the valve disc 23 by means of the supplied air and, when the valve disc 23 has been rotated to the valve-closed state, the seat ring 24 is allowed to abut on and separate from the valve disc 23 by means of the supply of air to the airflow path 25 and the biasing force of the spring 26 to control the flow rate (pressure) within the flow passage 21. By controlling the pressure with the valve opening/closing mechanism 22, the pressure control butterfly valve can control the pressure with high accuracy while performing slow-pump of the vacuum chamber 11.

The abutment and separation of the seat ring 24 on and from the valve disc 23 are performed through supply and stop of air or adjustment of air to be supplied by the electromagnetic valve 16 and electropneumatic regulator 17. The electromagnetic valve 16 and electropneumatic regulator 17 are connected to as disposed in parallel to the first and second branch flow paths 56 and 57. Furthermore, a pump 62 is connected to the electromagnetic valve 16 and electropneumatic regulator 17. The electromagnetic valve 16 and electropneumatic regulator 17 are operated when operation air is supplied from the pump 62 to control the flow passage.

The electromagnetic valve 16 can be operated to valve-opened and valve-closed states and, in each of the states, is configured so that the air from the pump 62 may be supplied and the supply of the air may be stopped. On the other hand, the electropneumatic regulator 17 may have a structure in which the amount of air supplied to the valve body 15 is controlled so that an internal piston (not shown) may control the pressure in the range of 0 to 0.5 MPa. Otherwise, it may have a structure in which the position of the seat ring 24 can be controlled through on-off control of the pressure to be applied.

Though the respective internal structures of the electromagnetic valve 16 and electropneumatic regulator 17 are omitted from illustration, any internal structure may be adopted insofar as the electromagnetic valve 16 is an on-off valve and the electropneumatic regulator 17 is a flow control valve capable of controlling a flow rate. In addition, these are not necessarily disposed to be integral with or close to the valve body 15 insofar as they can supply a prescribed amount of air to the first and second branch flow paths 56 and 57, respectively. They can be disposed at optional positions of the pipeline 10.

On the other hand, the actuator 18 has the stepping motor 32 mounted on the inside thereof and can control the rotation of the valve disc 23 at a prescribed angle via the valve shaft 28 by the stepping motor 32. As shown in FIG. 1, the controller 19 is connected to the stepping motor 32 and also to the electropneumatic regulator 17. The controller 19 has a valve disc control section 65 and an air control section 66. The valve disc control section 65 and air control section 66 have substrates (not shown), respectively.

The valve disc control section 65 controls the rotation direction and rotating speed of the stepping motor 32 and also controls the number of rotations of the valve disc 23. On the other hand, the air control section 66 controls the valve travel of a valve disc (not shown) within the electropneumatic regulator 17 and, when air has been supplied from the pump 62 to the electropneumatic regulator 17, controls the amount of air (pressure) to be supplied to the airflow path 25. Thus, the air control section 66 controls the output pressure applied to the airflow path 25 with the electropneumatic regulator 17 to control the degree of opening of the seat ring 24.

Incidentally, in the present embodiment, a valve having the same function as the electropneumatic regulator 17 may be disposed at the position of the electropneumatic regulator 17. As this valve, though not shown, a flow control valve having an orifice flow passage can be cited.

Figure 4:
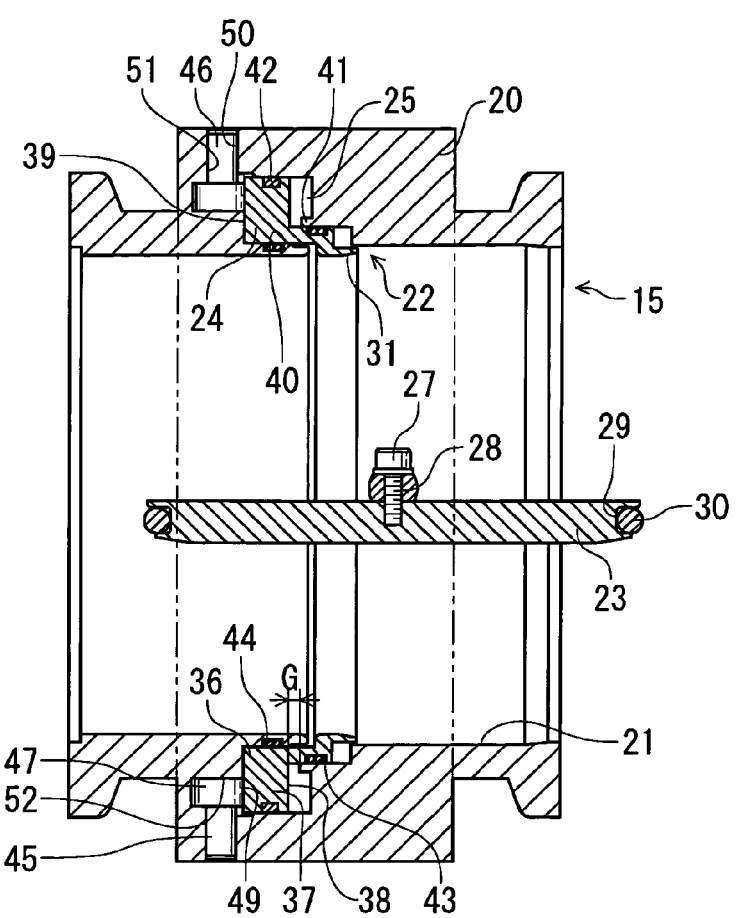
FIG. 4($a$) is a partially enlarged cross section illustrating a valve body, FIG. 4($b$) an enlarged view of a principal part of FIG. 4($a$), and FIG. 4($c$) an enlarged plan view of an eccentric cam.
Figure 4:
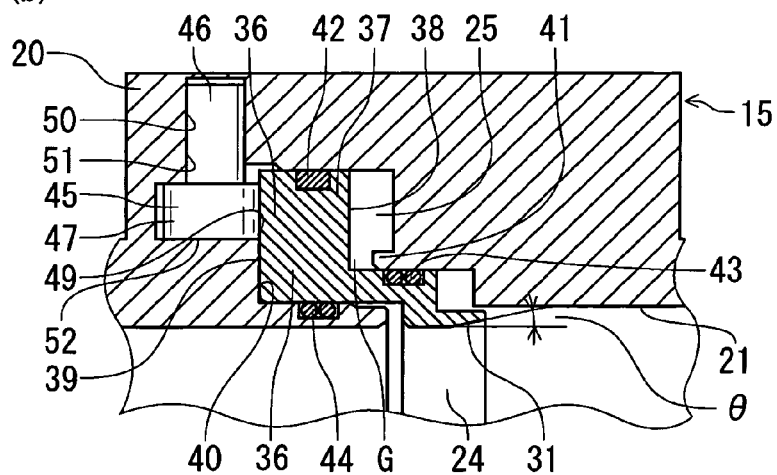
Figure 4:
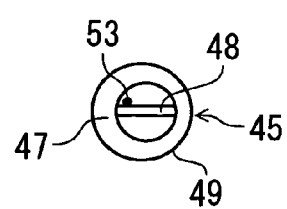

Next, the operation and function of the pressure control butterfly valve according to the aforementioned embodiment of the present invention will be described. First, in order to bring the valve-opened state to the valve-closed state, in the state shown in FIG. 4 wherein the electromagnetic valve 16 and electropneumatic regulator 17 are in an opened-state, air is supplied from the pump 62 to the airflow path 25. As a result, the air is supplied from the airflow path 25 to the attachment concave 40 to move, as shown, the seat ring 24 to the left side against the biasing force of the spring 26. In this moment, the rotation of the stopper 45 shown in FIG. 4(c) is adjusted and the cam face 49 is set in an appropriate state to regulate the travel distance of the seat ring 24. In the drawing, adjustment is made so that the surface side having a smaller amount of eccentricity of the cam face 49 is disposed on the side of abutment on the seat ring 24 to enlarge the travel distance of the seat ring 24.

Subsequently, the valve disc control section 65 is controlled, with the above state maintained, to rotate the stepping motor 32 by a prescribed amount and, as shown in FIG. 5, to rotate the valve disc 23 of the valve body 15 to a valve-closed position. At this time, since the seat ring 24 is maintained in a state having separated from the valve disc 23, the valve disc 23 is nonslidably rotated relative to the seat ring 24. In addition, since the valve shaft is made eccentric from the center $O_1$ in the direction of the flow passage and from the center $O_2$ of the flow passage, the portion of the valve disc 23 in the vicinity of the valve shaft does not come into contact with the seat ring 24. For this reason, inferiority in sealability resulting from the rotation of the valve disc 23 can be prevented to enable the sealability at the time of valve-closed state to be maintained as described herein below.

Next, as shown in FIGS. 3 and 6, the electromagnetic valve 16 is brought to a closed state and the supply of air to the airflow path 25 is, stopped, thereby discharging the air from the attachment concave 40. As a result, the spring 26 snap-biases the seat ring 24 toward the valve disc 23 to seal the O-ring 30 of the valve body 23 with the valve seat seal part 31 of the seal ring 24. At this time, since the O-ring 30 abuts on the inner circumferential side of the tapered valve seat seal part 31, when the seat ring 24 has been moved toward the O-ring 30 by means of the biasing force of the spring 26 in FIG. 3, as shown in FIG. 6(*b*), the O-ring 30 is deformed as being reduced in diameter along the surface of the valve seat seal part 31, thereby attaining high sealability. As a consequence of the valve-closing operation of the valve body 15, the pipeline 10 between the vacuum chamber 11 and the vacuum pump 12 is brought to a closed state.

The case of performing slowpump from the valve-closed state and the case of controlling process gas pressure after the slowpump will be described. First, the case of subjecting the inside of the vacuum chamber 11 to slowpump after the operation of gradually valve-closed state, i.e. the case of depressurizing the vacuum chamber 11 closed in a atmospheric pressure state to a value (vacuum state) through gradual discharge of air from the atmospheric pressure, will be described. In the case of performing slowpump from the aforementioned state, with the electromagnetic valve 16 maintained in a closed state, the air control section 66 is used to first control the valve travel of the electropneumatic regulator 12, then control the pressure to be applied to the airflow path 25 and control the degree of opening of the seat ring 24.

At this time, the electropneumatic regulator 17 is controlled so that the internal pressure of the vacuum chamber 11 may be at 0 atmosphere from the atmospheric pressure (760 Torr) when a prescribed slowpump time has passed. That is to say, the slowpump time T at a depressurization rate not entailing a problem of generating particles in the vacuum chamber 11 when the vacuum chamber 11 is depressurized from the atmospheric pressure to a 0 atmosphere, has been set in advance. The valve travel of the electropneumatic regulator 17 is controlled so that the internal pressure of the vacuum chamber 11 may be proportionately reduced during the set slowpump time T. With this control of the valve travel, the pressure of air supplied to the airflow path 25 is adjusted to minutely control the amount of travel of the seat ring 24 relative to the valve disc 23, thereby controlling the amount of the gap between the seat ring 24 and the valve disc 23.

By thus controlling the valve distance of the electropneumatic regulator 17 with the air control section 66, the amount of leak in the neighborhood of the atmospheric pressure is controlled to a micro amount and, by controlling the valve distance to be larger in proportion as the atmospheric pressure becomes a low vacuum, the vacuum pressure in the vacuum chamber 11 becomes easy to vary from the atmospheric pressure to 1 Torr or less within the set slowpump time T.

When the air has been discharged so that the vacuum pressure may reach 1 Torr or less within the set time, the electropneumatic regulator 17 is brought to a closed state and, at the same time, the electromagnetic valve 16 is controlled to be in an open state. At this time, the air is supplied to the airflow path 25 via the electromagnetic valve 16 to move the seat ring 24 to the position of the stopper 45. Furthermore, the valve control section 65 controls the rotation of the stepping motor 32 to bring the valve disc 23 of the valve body 15 to a fully open condition and terminate the control.

On the other hand, when it is impossible to discharge the air so that the vacuum pressure may reach 1 Torr or less within the set time, the electropneumatic regulator detects output pressure in a fully open condition of the seat ring and, from the results of this detection, makes a switch to a valve disc control by the stepping motor to perform slowpump within the set time in consequence of gradually opening the valve disc 23. After reaching the set vacuum pressure as a result of the slowpump, the valve disc 23 is brought to a fully open condition to terminate the control. After the slowpump, owing to the ability of the vacuum pump 12, the vacuum chamber 11 is depressurized to a high vacuum.

Figure 9:
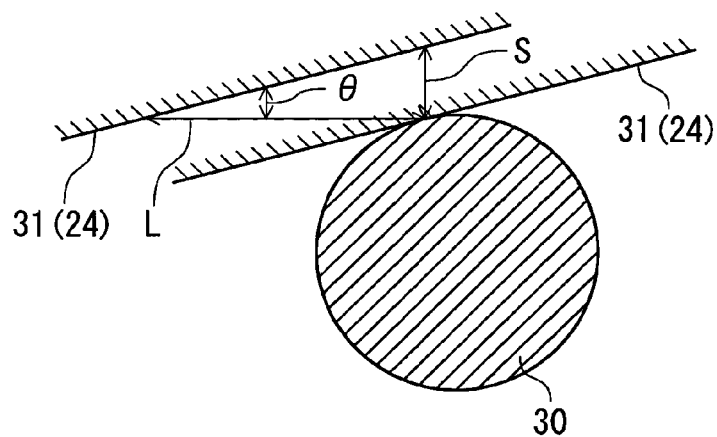
FIG. 9 is a schematic view showing the positional relationship between an O-ring and a seat ring.

At the time of the above control, since the valve disc 23 and seat ring 24 have a seal structure utilizing the O-ring 30 and taped valve seat seal part 31, it is possible to control a micro flow rate particularly in the neighborhood of the atmospheric pressure. To be specific, in FIG. 9, assuming that a distance in the direction of the flow passage when the valve seat seal part 31 (seat ring 24) is separated from the O-ring 30 is L, a space S generated by the distance L in the diametrical direction between the seat ring 24 and the O-ring 30 is expressed as $S = L \times \tan \theta$ ($\theta$: taper angle). When $\theta = 10°$, the travel distance L of the seat ring 24 for controlling the space S to be 0.1 mm or less becomes about 0.6 mm. Thus, it becomes possible to accurately control the amount of the space S while roughly controlling the travel distance L with a large stroke.

Furthermore, the travel distance L is adjusted with the stopper 45 to make it possible to set the space S at the time of the fully open condition to be around 0.1 to 0.2 mm and lessen the conductance. Thus, the flow rate control by both the O-ring 30 and the seat ring 24 having the taper angle $\theta$ enables the travel distance L of the seat ring 24 in the direction of the valve disc to be made small by means of the space S, thereby enabling a micro control. For this reason, the control at the time of slowpump can be made with high accuracy.

Furthermore, since the valve body 15 has a double eccentric valve structure, it is opened and closed in the state in which the space between the valve seat seal part 31 and the O-ring 30 even when the valve disc has a small width, thereby attaining the minimum conduction at the time of the micro flow rate. For this reason, interference between the valve disc 23 and the valve seat seal part 31 is suppressed at the time the valve disc 23 is rotated to enable the valve disc 23 to be rotated smoothly.

After the slowpump, a process gas is flowed to make a target pressure control. In the process gas pressure control, gas introduction and pressure control start from the state in which the valve disc 23 has been fully open and evacuation to a high vacuum has been established, and a PID operation for adjusting the pressure to a set pressure is made. In the PID operation, though there is a case where the start of the gas introduction is prior to or subsequent to the start of the pressure control, a high-speed valve-closing operation and a stable control are performed when the pressure control starts.

The valve disc 23 is rotated until the valve-closed state by controlling the stepping motor 32. Since the valve seat seal part 31 is separated from the O-ring 30 after the rotation of the valve disc, the valve disc 23 is rotated in a state of little slide resistance to enable a low-torque high-speed pressure control. Furthermore, since the relationship between the valve seat seal part 31 and the O-ring 30 is set to be Min conductance, the pressure control in a wide range can be made.

In the valve-closed state, the pressure applied to the airflow path 25 by means of the electropneumatic regulator 17 is subjected to a PID control to control the process gas pressure as a consequence of the travel of the seat ring 24. In the pressure control, in the state of a small flow rate of the process gas or in the case where the set pressure is high and where the pressure does ascend to the set pressure even when the valve travel of the valve disc is 0%, the pressure applied to the airflow path 25 by means of the electropneumatic regulator 17 is subjected to the PID control, with the 0% valve travel of the valve disc maintained, to control the seat ring 24 in the closing direction. As a result, the control can be made even under high pressure in the neighborhood of the atmospheric pressure.

The PID control is a kind of feedback control and is a control of an input value performed using elements comprising deviation, integration and differential of an output value and a target value. Since the PID control is a control method generally performed widely, the details thereof are omitted from the description.

The pressure control of the process gas in the valve-closed state is performed through subjecting the pressure applied by the electropneumatic regulator 17 to the airflow path 25 to the PID control to control the seat ring 24 in the opening or closing direction. In this case, when the set pressure in a low vacuum region and when the pressure does not descend through only the pressure control of the seat ring 24, the following procedure is taken in order to lower the pressure. The procedure comprises using the output pressure of the electropneumatic regulator 17 to detect pressure bringing the seat ring 24 in the airflow path 25 to a fully open condition, making a switch to the PID control of the stepping motor 32 depending on the result of detection and controlling the discharge air pressure up to a target pressure through a valve opening/closing control of the valve disc 23. Thus, by a switch control between a control range from no leak by the electropneumatic regulator 17 and a control range from Min conductance by the motor drive, it is possible to secure a wide control range and enable both the process gas pressure control and the slowpump control.

As regards the slowpump control or gas pressure control, at the time of pressure control toward the side of closing the valve, the electropneumatic regulator 17 is used to detect the pressure enabling the seat ring 24 to fully open, thereby making a switch to a control of the stepping motor 32, whereas at the time of pressure control toward the side of opening the valve, the pressure in the airflow path 25 is controlled by discharge air under the condition of a 0% valve travel by the control of the stepping motor 32 to enable a continuous control of two control systems, one from the valve-closed state of the seat ring 24 to the Min conductance of the valve body 15 and the other from the Min conductance by the control of the valve disc of the valve body 15 to the Max conductance. At this time, in order to stabilize the process gas at high speed, it is better to control only the valve disc 23 of the valve body 15 and, to widen the pressure adjusting range of the process gas, it is better to set the space S between the seat ring 24 and the valve disc 23 to be the minimum allowing nonslidable rotation of the valve disc 23.

In the case of not performing the continuous switch control by the two control systems, the process gas control is performed by only the rotation of the valve disc 23 and, in the case of performing a control of high pressure in the neighborhood of the atmospheric pressure, such as cleaning, it is preferred that it be performed only by the control of the seat ring 24. The pressure at the time of the process gas pressure control only by the rotation of the valve disc 23 is around 0.5 to 5 Torr, for example. On the other hand, the pressure at the time of cleaning is around 700 Torr, for example. Furthermore, the slowpump control is performed at the time from the atmospheric pressure to around 100 Torr being approximately 10 to 20 minutes.

Incidentally, in the case of bringing the valve body 15 to the fully closed state again from the motor control state, the valve disc 23 is rotated until the fully closed position and the air in the airflow path 25 is discharged by turning the electromagnetic valve 16 off. As a result, the spring 26 thrusts the seat ring 24 onto the O-ring 30 to attain sealing, thereby bringing the flow passage 21 to a closed state.

In the case of disposing a flow control valve having an orifice flow passage and fulfilling the same function as the electropneumatic regulator at the position of the electropneumatic regulator, by controlling the flow control valve at high speed, a micro flow rate of air is supplied to the attachment concave 40 via the orifice passage to enable the seat ring to be operated while being reduced in operation speed. As a result, the seat ring 24 is gradually moved to enable the slowpump. In this case, the slowpump can be performed inexpensively as compared with the case using the electropneumatic regulator 17.

As described in the foregoing, in the pressure control butterfly valve according to the present invention, since the valve opening/closing mechanism 22 comprising the valve disc 23, seat ring 24, airflow passage 25 and spring 26 is disposed in the valve body 15 and, since the flow passage 21 is subjected to an opening/closing control while securing high sealability with the valve opening/closing mechanism 22, it is possible to maintain the overall compactness with the butterfly valve structure, secure the footprint property saving and fulfill the isolation function by the high-speed control. For this reason, in the case of using the pressure control butterfly valve of the present invention for the conventional vacuum flow passage 5, it will be possible to attain space saving as a whole and, even in the flow passage of a large flow rate, to control the vacuum pressure with high accuracy. Moreover, since the pressure control butterfly valve uses no expensive part, it can be disposed inexpensively.

Furthermore, in the valve opening/closing mechanism 22, since the valve disc 23 is rotated through the supply of air to the airflow path 25 in the state separating from the seat ring 24, the stepping motor 32 of small output torque is utilized to enable high-speed control while securing the sealability by the valve seat seal part 31 without sliding the valve disc 23 relative to the seat ring 24. Therefore, even when the actuator 18 of small output has been used, the valve disc of the valve body 15 in the range of from a small-bore of 40 A to a large-bore of 150 A, for example, can be operated at high speed. In addition, the valve disc 23 or seat ring 24 is prevented from being worn away to enhance leak performance during the vacuum pressure control. Furthermore, the service life of the O-ring 30 is lengthened to enhance the durability and enable the rotation operation limits of the valve disc 23 to be enhanced up to around million times.

In addition, since the control is made by means of the valve opening/closing mechanism 22 in the state in which the electromagnetic valve 16 and electropneumatic regulator 17 are connected to the airflow path 25 in parallel, it is possible to provide the pressure control butterfly valve capable of easily control the pressure via the one airflow path 25 from the valve-opened state to the valve-closed state utilizing the electromagnetic valve 16 and electropneumatic regulator 17.

What is claimed is:

1. A pressure control butterfly valve comprising:
   a valve disc rotatable in a vertical direction relative to a flow passage in a body;
   a seat ring reciprocating in a direction of the flow passage to allow a valve seat seal part to abut on and separate from the valve disc;
   a valve opening/closing mechanism provided with an airflow path to which air is supplied in a direction of separating the seat ring from the valve disc and with a spring for biasing the seat ring toward the valve disc; and
   an electromagnetic valve for supplying the air from a pump to the airflow path and stopping the supply of the air and an electropneumatic regulator which are connected in parallel;
   wherein the valve opening/closing mechanism is for nonslidably rotating the valve disc from which the seat ring has been separated by supply of air to the airflow path and for allowing the seat ring to abut on and separate from the valve disc by means of the supply of air to the airflow path and a biasing force of the spring when the valve disc has been rotated to a valve-closed state, thereby controlling pressure in the flow passage.

2. A pressure control butterfly valve according to claim 1, further comprising a stepping motor connected to the valve disc for transmission of rotation and a controller connected to the stepping motor and to the electropneumatic regulator, wherein the controller comprises a valve disc control section for controlling rotation of the stepping motor to control a number of rotations of the valve disc and an air control section for controlling output pressure applied to the airflow path by the electropneumatic regulator to control a degree of opening of the seat ring.

3. A pressure control butterfly valve according to claim 1, wherein the valve disc has a rotating shaft eccentric from a center of the valve disc and a center of the flow passage.

4. A pressure control butterfly valve comprising:
   a valve disc rotatable in a vertical direction relative to a flow passage in a body;
   a seat ring reciprocating in a direction of the flow passage to allow a valve seat seal part to abut on and separate from the valve disc; and
   a valve opening/closing mechanism provided with an airflow path to which air is supplied in a direction of separating the seat ring from the valve disc and with a spring for biasing the seat ring toward the valve disc;
   wherein the valve opening/closing mechanism is for non-slidably rotating the valve disc from which the seat ring has been separated by supply of air to the airflow path and for allowing the seat ring to abut on and separate from the valve disc by means of the supply of air to the airflow path and a biasing force of the spring when the valve disc has been rotated to a valve-closed state, thereby controlling pressure in the flow passage;
   wherein the valve disc is provided on a side of contact with the valve seat seal part with an O-ring, and the valve seat seal part is formed on an inner circumferential side of the seat ring into a tapered or circular arc shape gently enlarged in diameter from an inside diameter side toward an outside diameter side.

5. A pressure control butterfly valve according to claim 1, wherein the body has a stopper attached thereto for regulating to a prescribed position the seat ring that has moved by supply of air to the airflow path.

6. A pressure control butterfly valve comprising:
   a valve disc rotatable in a vertical direction relative to a flow passage in a body;
   a seat ring reciprocating in a direction of the flow passage to allow a valve seat seal pad to abut on and separate from the valve disc; and
   a valve opening/closing mechanism provided with an airflow path to which air is supplied in a direction of separating the seat ring from the valve disc and with a spring for biasing the seat ring toward the valve disc;
   wherein the valve opening/closing mechanism is for non-slidably rotating the valve disc from which the seat ring has been separated by supply of air to the airflow path and for allowing the seat ring to abut on and separate from the valve disc by means of the supply of air to the airflow path and a biasing force of the spring when the valve disc has been rotated to a valve-closed state, thereby controlling pressure in the flow passage;
   wherein the body has a stopper attached thereto for regulating to a prescribed position the seat ring that has moved by supply of air to the airflow path;
   wherein the stopper comprises a columnar pin and a cam that is eccentric from the pin and has a cam face on which the seat ring abuts.

* * * * *